KANTARO MÔRI
INVENTOR

By Wenderoth, Lind & Ponack
ATTORNEYS

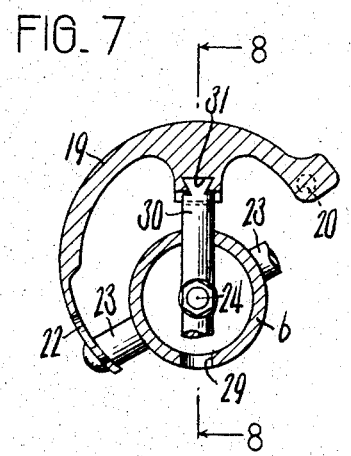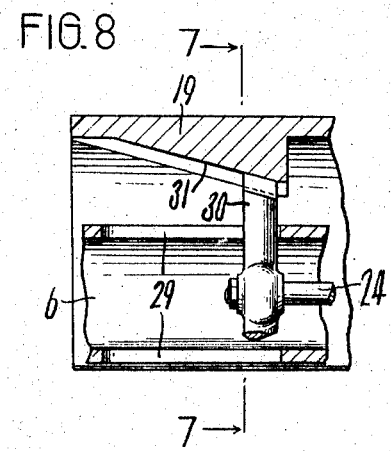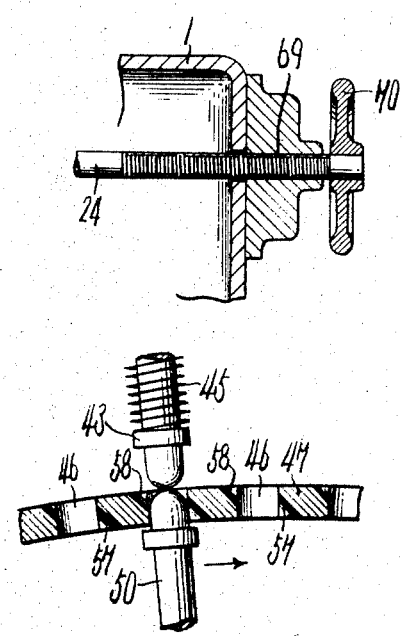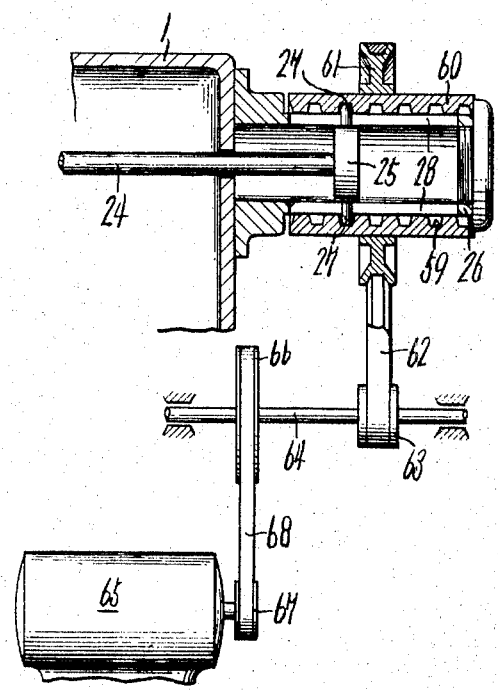

United States Patent Office 3,435,865
Patented Apr. 1, 1969

3,435,865
RICE-CLEANING MACHINE
Kantaro Mori, Hikone-shi, Japan, assignor to Mori Seikoku Kenkyusho Company Limited, Hikone-shi, Japan
Filed Sept. 21, 1966, Ser. No. 580,932
Int. Cl. B02d 3/00; B02c 9/00
U.S. Cl. 146—279                10 Claims

ABSTRACT OF THE DISCLOSURE

A rice-cleaning machine which has diametrically expanable and contractable means on the drum for varying the rice-cleaning rubbing pressure. The means is a pair of semicircular bodies pivoted at one circumferential edge to the end plates. Diametrical expansion and contraction is achieved by the pivoting of the semicircular bodies.

---

The present invention relates to an improvement in rice-cleanging machines in which a revolving drum adapted for thrashing the rice grains is arranged within a polygonal wire screen casing so that the raw rice grains fed into the annular space between the drum and the screen are rubbed against each other when the drum revolves.

The fibriform pericarp layers of the raw rice grains are very hard and sticky on the peripheral outer surface and require a higher rubbing pressure on the grains during the initial cleaning stage so as to quickly and speedily remove these outer hard and sticky layers. However, as the cleaning operation advances, the grain rubbing pressure must gradually be lowered in proportion to the progress of the pericarp layer removal, because the hardness and stickiness of the layers are gradually reduced the closer the layers are to the amyloid material center of the grain, and a higher pressure such that employed in the initial rubbing stage will be too strong at the later stage because the grain surface will be softer and more fragile. Rice grain rubbing at a constant lower pressure throughout the cleaning operation requires a longer duration of the rubbing while a constant higher pressure causes uneven wear of the pericarp layer or crushing of the grains as the removal of the hard pericarp layer progresses. In order to moderate the grain rubbing pressure in the cleaning chamber, it has been suggested to control the exhausting of the cleaned grains by a spring or gravity means which resiliently closes the grain outlet from the cleaning chamber. This adjusting method, however, failed to modulate the pressure uniformly throughout the chamber and the cleaning efficiency was not satisfactory.

The principal object of the present invention is to provide an improved rice-cleaning machine in which the thrashing revolving drum diameter is expanded or contracted so as to effectively control the rice grain rubbing pressure.

Another object of the present invention is to provide a thrashing drum having a plurality of hinged swinging body pieces to permit diametral expanding or contracting by swinging movement of the hinged body pieces.

A further object of the present invention is to provide a grain rubbing pressure control means manually and/or automatically operatively arranged in conjunction with the thrashing drum structure.

Further objects and advantages of the present invention will become apparent from the following detailed description taken together with the accompanying drawings in which:

FIG. 7 is a cross sectional view taken on line 7—7 of FIG. 8;

FIG. 8 is a cross sectional view taken along line 8—8 of FIG. 7;

FIGS. 9 and 10 are enlarged fragmentary views showing modifications of a part of FIG. 1; and FIG. 11 is an enlarged fragmentary view of a portion of FIG. 6 showing a detailed locking pin engagement.

Figure 1:
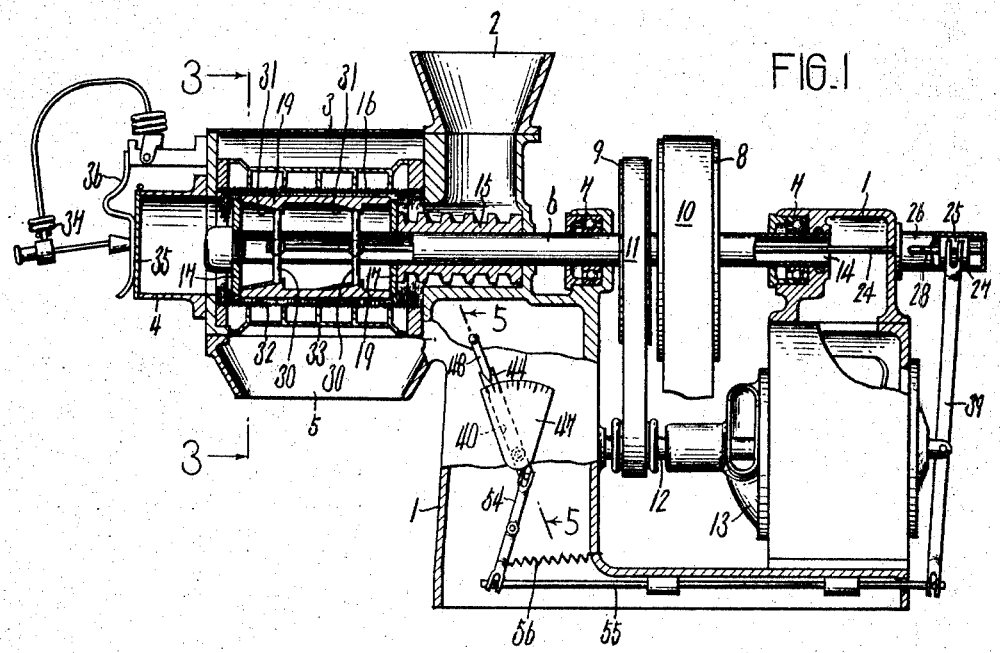
FIG. 1 is a side elevation view, partly in section, of the machine according to the present invention.

Referring to the drawings and particularly to FIG. 1, the cleaning machine comprises a frame 1 having a hopper 2 with an opening at its upper end for feeding the rice grains into the machine. Disposed adjacent the said hopper 2 is a cleaning chamber casing 3 having a grain outlet 4 in its left end wall and a bottom hopper 5 opening out of the bottom of the casing 3. Horizontally and rotatably mounted on the frame 1 is a hollow shaft 6 which is mounted in bearings 7 and has pulleys 8 and 9 keyed thereon. The pulley 8 is connected by a belt 10 with a pulley on the driving shaft (not shown) and the pulley 9 is connected by a belt 11 to a shaft 12 of a blower 13 disposed on the frame 1. The hollow shaft 6 communicates at one end 14 with an air outlet from the blower 13.

Coaxially secured on the shaft 6 below the hopper 2 is a spiral conveyer 15 for feeding the rice grains to the cleaning chamber 16. Longitudinally spaced along and secured to the shaft 6 at the end thereof in the cleaning chamber 16 is a pair of stomach-shaped end plates 17 (see FIGS. 2 and 4) and disposed between the said end plates 17 is a thrashing drum 18 which is composed of a pair of semicircular bodies 19 each one of which is pivotally connected at one circumferential edge to the end plates 17 by means of a pin 20, the arrangement leaving longitudinal ports 21 at the circumferential edge which is the trailing edge relative to the direction of the revolving drum 18. Opening out of the free circumferential edge of each body 19 are circumferential slots 22 each one of which engages with each retaining pin 23 which extends radially from the hollow shaft 6 so that each semicircular body 19 is pivoted on a fulcrum constituted by the pin 20 for movement in the amount that the slots 22 permit.

Extending longitudinally within the hollow shaft 6 is an adjusting spindle 24 which is journaled at one end in a bearing 25 housed within a casing 26 fixed at one end of the frame 1 remote from drum 18. The bearing 25 has a pair of radial pins 27 for engagement in longitudinal slots 28 in order to limit the bearing 25 to longitudinal sliding movement and to prevent the rotation of the bearing. Connected at other end of the spindle 24 and extending radially through axial slots 29 in the hollow shaft 6 are arm sliders 30 each end of which is engaged with a groove 31 provided on the inner peripheral surface of each of the semicircular bodies 19 and having an inclined bottom surface.

Fixed to the chamber casing 3 and coaxially enclosing the revolving drum 18 is a wire screen casing 32 which is polygonal in cross section and which is supported by similarly shaped frames 33 fixed to the casing 3. Disposed adjacent the axial slots 29 on the hollow shaft 6 are air outlets 34 through which the air from the blower 13 is fed to the cleaning chamber. Hinged to the grain outlet 4 is a cover plate 35 which is urged by a spring 36 having a gravity means 37 thereon and attached to the casing 3, in a direction to close the outlet 4.

Figure 5:
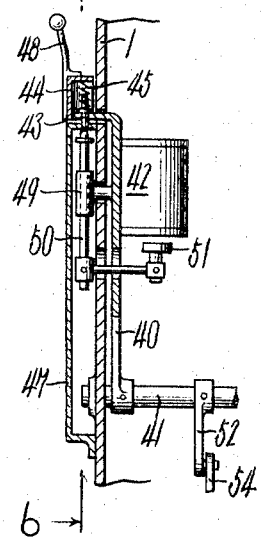
FIG. 5 is a fragmentary cross sectional view on an enlarged scale and taken along line 5—5 of FIG. 1.

Pivotally connected to the right-hand end of the frame 1 is a swing arm 39 which is forked at an end and has the fork engaged with the pin 27 on the bearing 25. On the left-hand side of the frame 1 is a swing arm 40 pivoted at its lower end on the inside of the frame 1 on a pivot rod 41 (see FIGS. 5 and 6) and carrying on the upper end thereof an electromagnet 42. Disposed at the top of the said arm 40, which is bent over and extends through a curved slot in the sidewall of frame 1 to the outside of the frame is a locking pin 43 which is housed in a casing 44 and is urged by a spring means 45 so as to engage in one of the locking pin holes 46 in the top end wall of a locking box 47 mounted on the frame 1. The casing 44 has a handle 48 thereon for manually swinging the arm 40. Within the locking box 47 is a lock releasing pin 50 extending between the locking pin 43 and the pivot 41 and longitudinally slidably mounted in a guide 49 mounted on the arm 40 by an extension also extending through a curved slot in the side wall of frame 1. The lock-releasing pin 50 has a magnetic piece 51 connected to the lower end of the pin 50 by a piece extending through a slot in the sidewall of frame 1 and which magnetic piece is adjacent the electromagnet 42. When an electric current flows when a circuit, not shown, is closed, the magnetic piece 51 is attracted by the said magnet 42 and the releasing pin 50 connected to the piece 51 is raised to push back and disengage the locking pin 43 from the locking pin hole 46. (FIG. 11)

A short arm 52 is connected at one end to the pivot rod 41 and extends downwardly therefrom, and the lower end thereof is engaged with the forked upper end of a swivel arm 54 which is pivotally connected to the frame 1. The forked lower ends of the arms 54 and 39 are pivotally engaged with the opposite ends of a link rod 55 so that the swinging movement of the arm 40 causes axial motion of the adjusting spindle 24. A spring means 56 has one end connected to the frame 1 and other end connected to the lower end of the swivel arm 54 and urges the swivel arm 54 to rotate in a counterclockwise direction.

Figure 3:
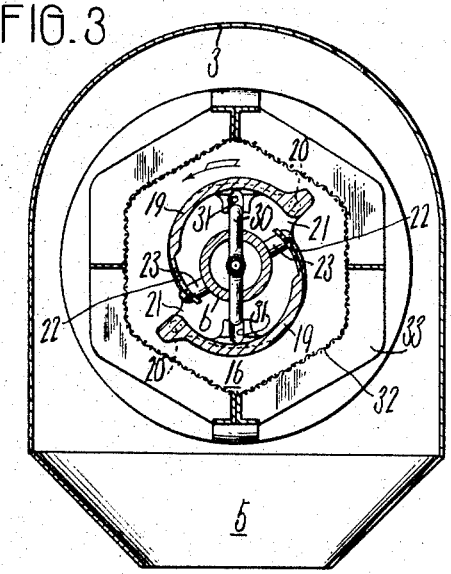
FIG. 3 is a cross sectional view on an enlarged scale and taken along line 3—3 of FIG. 1.
Figure 6:
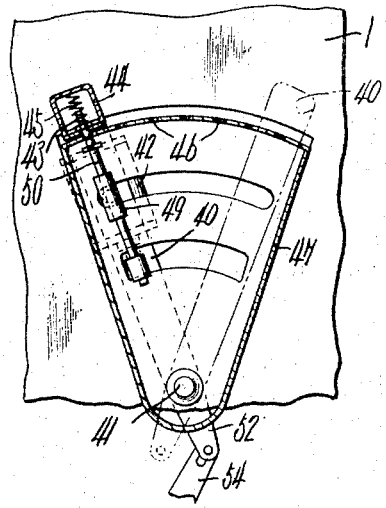
FIG. 6 is a sectional view taken along line 6—6 of FIG. 5.

The hollow shaft 6 is driven by a motor, not shown, through the belt 10 and pulley 8, and during the rotation of the shaft 6 the spiral conveyor 15 and the thrashing drum 18 are rotated together. Rice grains are continuously supplied from the hopper 2 and fed by the revolving spiral conveyor 15 into the cleaning chamber 16 wherein the rice grains are thrashed by the rotation of the drum 18 and rubbed against each other in the annular space between the revolving drum and the polygonal wire screen casing 32. At the same time the hollow shaft is rotated, the shaft 12 of the blower 13 is also driven through the belt 11 and pulley 9, and the air pumped thereby is led from the opening at the end 14 into the hollow shaft 6 and exhausted through outlets 34 and slits 29 into the cleaning chamber 16 to cool the grains being thrashed and at the same time preventing clogging of the openings in the wire screen by the bran by the flow of the air therethrough. The bran is exhausted through the lower hopper 5. If the raw rice grains have hard pericarp layers, the grain rubbing pressure must be considerably higher in order to sharply and speedily remove such a hard pericarp, but for grains having softer pericarp layers, the rubbing pressure must be carefully lowered in order to avoid excessive wear or crushing of the grains. The rubbing pressure will therefore be carefully selected according to the condition of the rice grains to be cleaned. Because of this problem it is advisable to carry out the cleaning treatment in several stages with the rubbing pressure in each stage being gradually lowered in conformity with the progress of the removal of the harder pericarp layers. In the initial stage the cleaning operation will be carried out with the thrashing drum 18 at its maximum diameter as shown in FIGS. 1 and 3 with the annular space of the chamber 16 being at a minimum. In this condition of the radial expansion of the drum 18 the rise grain rubbing pressure will be maximized. During the cleaning treatment, the raw rice grains are continuously supplied through the hopper 2 and the exhausting of the treated rice grains through the outlet 4 is controlled by the hinged cover plate 35 which is resiliently urged to close the outlet by the spring 36 and gravity means 37 so that the feeding and exhausting of the rice grains is kept in equilibrium in order to maintain the rubbing pressure in the chamber 16 constant in a predetermined range. During the above described initial stage the swing arm 40 is locked in the left locking position as shown in FIGS. 1 and 6 wherein the locking pin 43 is in locking engagement with the leftmost pin hole 46. With the swing arm 40 in this locking position, the swivel arm 54 will be held in a clockwise rotated position against the contracting force of the spring 56 and locked by the short arm 52 which extends downwardly from the pivot rod 41 and engages with the upper end of the swivel arm 54. The link rod 55 with the left-hand end joined to the forked lower end of the arm 54 is in the extreme leftwardly shifted position, and the swing arm 39 pivoted to the frame and engaged to the right-hand end of the link rod 55 at the forked lower end is in a clockwise rotated position. With these parts in this position, the bearing 25 with the radial pins 27 longitudinally slidably engaged in the axial slits 28 of the casing 26 and joined to the forked upper end of the arm 39 will be in the rightwardly shifted position and the adjusting spindle 24 journaled at its rght-hand end in the bearing 25 will be in the rightwardly shifted position together with the arm sliders 30 which are connected to the left-hand end of the spindle 24 and longitudinally slidably engaged in the sloping grooves 31. The grooves 31 slope radially inwardly from the left to the right so that the rightward shifting of the arm slider 30 engaged in the said grooves causes radial outward pivoting of the semicircular bodies 19 resulting expansion of the diameter of the thrashing drum 18. Thus, with the swing arm 40 in the leftmost locking position the arm sliders 30 will be at the rightmost peak of the sloping grooves 31, as shown in FIGS. 1 and 8, so that the thrashing drum diameter is a maximum and the cleaning treatment is performed at a high grain rubbing pressure. This initial cleaning stage will be continued until a predetermined amount of raw rice grains circulates through the cleaning chamber, and roughly rubbed rice grains, exhausted from the outlet 4 during the initial stage, are returned by a conveyer, not shown, and subjected to the second cleaing stage by being fed again through the hopper 2.

In order to contract the diameter of the drum 18 to lower the rubbing pressure for the second stage of the cleaning treatment, the electromagnet 42 will be energized momentarily by an electric current by conventional means, not shown, such as momentarily switching on the magnet so that the magnetic piece 51 adjacent the magnet 42 and just below it is attracted, and the lock releasing pin 50 is raised as shown in FIG. 11 so that the locking pin 43 in engagement with the leftmost pin hole 46 in the top end wall of the locking box 47 is pushed up against the force of the spring means 45 and disengaged from the pin hole 46, so as to permit the clockwise rotation of the swing arm 40 under the contracting action of the spring means 56 which urges the swivel arm 54 and its upper end pivotally engaged with the lower end of the short arm 52. When the locking pin 43 is aligned with the next pin hole 46 during the travel of the arm 40 in the clockwise direction, the pin 43 within the casing 44 is urged by the spring means 45 into engagement with said next hole 46. During this clockwise rotation of the arm 40 and locking of the pin 43, the link rod 55 is shifted to the right by the counterclockwise rotation of the swivel arm 54 and causes counterclockwise rotation of the swing arm 39, and at the same time, the adjusting spindle 24 joined to the arm 39 in the bearing 25 is moved to the left so as to displace the arm sliders 30 in the sloping grooves 31 an amount determined by the said clockwise rotation of the swing arm 40. Each semicircular body 19 which is hinged at its one circumferential end to the end plates 17 by the pin 20 and which receives the squeezing load of the rice grains in the chamber 16 is pivoted radially inwardly around the pin 20 an amount corresponding to the displacement of the arm sliders 30 along the groove. The thrashing diameter of drum 18 is thus reduced and the grain rubbing pressure is lowered for the second cleaning treatment.

Figure 2:
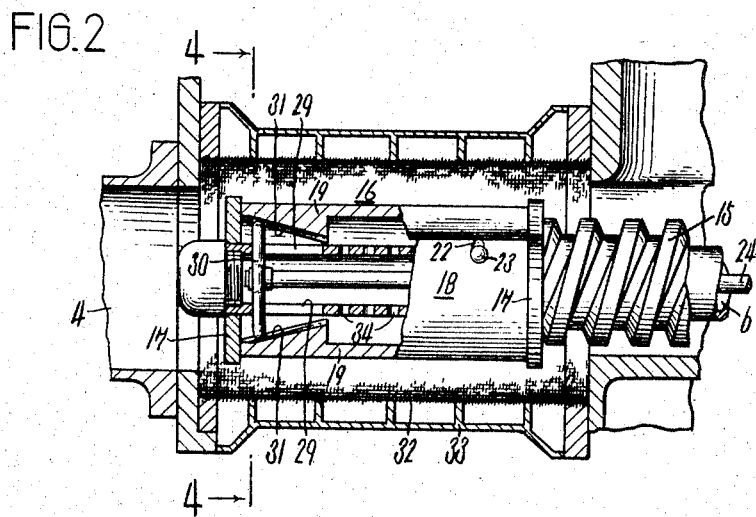
FIG. 2 is a fragmentary sectional view on an enlarged scale showing the cleaning chamber portion.
Figure 4:
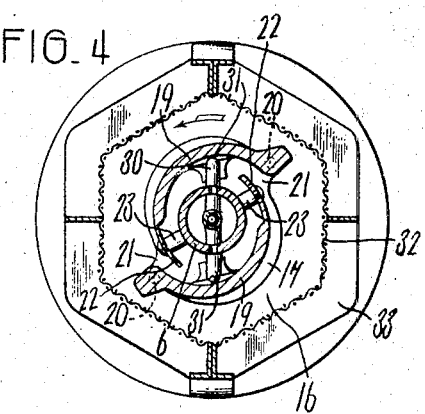
FIG. 4 is a cross sectional view taken along line 4—4 of FIG. 2.

Subsequent stages will likewise be performed and in each stage the arm sliders 30 are gradually displaced along the grooves in the direction of the radially outwardly sloping of the grooves by the same operation hereinbefore described with respect to the second cleaning stage. Displacement of the arm sliders gradually contracts the thrashing drum diameter, and in the final cleaning stage the swing arm 40 will be locked at the rightmost locking position, as shown in dotted lines in FIG. 6, and the arm sliders and adjusting spindle 24 will be at the leftmost position, as shown in FIG. 2, wherein each semicircular body 19 is in the innermost pivoted position and the thrashing drum diameter is a minimum, as shown in FIGS. 2 and 4.

After completion of the final cleaning treatment with the minimum thrashing drum diameter, the swing arm 40 is rotated back to the leftmost locking position by pulling the handle 48. With this action the swivel arm 54 and other arms and rods connected therewith are returned to the initial position, as shown in FIG. 1, thereby positioning the semicircular bodies 19 at the radially outermost pivoted position where the thrashing drum diameter is a maximum, as shown in FIG. 3.

In order to permit smooth starting of the clockwise rotation of the arm 40 when the locking pin 43 is disengaged from the pin hole 46 by the lock releasing pin 50, it will be advisable to provide a sloping undercut 57 extending from each pin hole 46 in the right-hand direction along the inside of the locking box top end wall so that the top end of the lock releasing pin 50 will slide smoothly along the said sloping undercut, as shown in FIG. 11. Because the attraction of the magnetic piece 51 by the electromagnet 42 is momentary and since the electromagnet 42 is demagnetized as soon as the locking pin 43 disengages from the pin hole 46 and permits dropping of the magnetic piece 51, the lock releasing pin 50 is separated from the undercut 57 during the sliding thereon and drops along the guide 49. On the outside surface of the locking box top end wall a sloping cut 58 extending leftwardly from each pin hole 46 permits the lower end of the locking pin 43 to slide along the said sloping cut 58 and smoothly disengage from the pin hole 46 when the arm 40 is rotated in the counterclockwise direction by pulling the handle 48 leftwardly, so that the arm 40 can be rotated to the leftmost position without being blocked by the said locking mechanism.

FIGS. 7 and 8 show a modification of the engagement of the arm sliders 30 with the sloping groove 31 of the semicircular body 19 wherein each slider arm 30 is slidably dovetailed into the groove, thereby avoiding the accidental radial outward pivoting of the semicircular body 19 by the effect of centrifugal force during the rotation of the thrashing drum 18.

Adjustment of the displacement of the arm sliders 30 can be performed by the means shown in FIG. 9, wherein the ends of the radial pins 27 projecting out of the longitudinal slits 28 from the bearing 25 are slidably engaged in a thread groove 59 of a revolving cylinder 60 rotatably mounted on the bearing casing 26. The said cylinder 60 is rotated through a pulley 61 keyed thereon and a belt 62 connecting the pulley 61 with a pulley 63 on a countershaft 64 which is operatively connected to a brake motor 65 through pulleys 66 and 67 and a belt 68. Operation of the brake motor 65 causes a predetermined amount of rotation of the cylinder 60, and during this rotation the groove 59 causes the pins 27 to move to the left or right along the slits 28, depending on the direction of rotation, and adjust the position of spindle 24 journaled in the bearing 25 and displaces the arm sliders 30 in the grooves 31.

Adjusting the position of the spindle 24 can be performed by providing a screw thread engagement 69 of the end of the spindle 24 with a frame portion as shown in FIG. 10 in which the adjusting spindle 24 can be manually rotated by a wheel handle 70 secured to the end of the spindle 24. When the spindle 24 is engaged with the frame 1 by means of the screw thread as hereinabove described, the arm sliders 30 must be rotatably mounted on the spindle 24 so as to prevent the spindle from rotating with the arm sliders which rotate with the thrashing drum and the hollow shaft during the cleaning operation.

I claim:

1. A rice-cleaning machine comprising a frame; a rice grain cleaning chamber on the frame; a hollow shaft horizontally and rotatably mounted on the frame and extending into the said rice grain cleaning chamber; shaft driving means coupled to said shaft for rotating said shaft; grain feed means for feeding the rice grains into the cleaning chamber; a diametrically expandable and contractable rice grain thrashing drum mounted on the end of the said hollow shaft in the cleaning chamber for rotation with the said hollow shaft, said drum comprising a pair of spaced end plates secured to the rotating hollow shaft, and at least one pair of semicircular bodies each pivoted at one circumferential edge thereof to the said end plates for permitting the diametrical expansion and contraction of the thrashing drum by the pivoting of the said semicircular bodies, and means on said drum for diametrically expanding and contracting said drum for varying the rice grain rubbing pressure.

2. A rice-cleaning machine as claimed in claim 1 in which each semicircular body has at least one groove in the inner surface thereof having an inclined bottom surface; and said means for diametrically expanding and contracting said drum comprise arm sliders slidably engaged in each of the said grooves and engaging the bottom surfaces thereof; and an adjusting spindle connected to said arm sliders and extending through the said hollow shaft for sliding the arm sliders along the grooves.

3. A rice-cleaning machine as claimed in claim 2 in which each arm slider is being slidably dovetailed in the groove of the semicircular body to prevent the radially outwardly pivoting of the semicircular body by centrifugal force.

4. A rice-cleaning machine as claimed in claim 2 in which said means for diametrically expanding and contracting said drum further comprise a swing arm pivotally connected to the frame and urged to rotate in one direction and coupled to the other end of the adjusting spindle to control the sliding displacement of the arm sliders along the grooves; a locking and unlocking mechanism on the said swing arm adapted to lock the swing arm on the frame and unlock to permit the said arm to rotate.

5. A rice-cleaning machine as claimed in claim 4 in which the said locking and unlocking mechanism includes a combination comprising a locking box having a plurality of aligned locking pin holes; a locking pin on the said swing arm and urged to engage with the said locking pin holes; a lock releasing pin longitudinally slidably disposed just below the said locking pin on the said swing arm; an electromagnet connected to the upper end of the said swing arm and a magnetic piece disposed below the said electromagnet and connected to the lower end of the lock releasing pin.

6. A rice-cleaning machine as claimed in claim 5, in which each locking pin hole has a sloping cut opening into it for permitting sliding of the ends of the locking pin and the lock releasing pin when the said swing arm rotates.

7. A rice-cleaning machine as claimed in claim 2, in which said frame has a bearing case fixed thereto and a bearing being longitudinally slidable in said bearing housing and being connected to an end of the said adjusting spindle and said spindle end being journaled in the said bearing; said case having a pair of longitudinal slits therein and the said bearing having a pair of radially extending pins thereon engaged with the said longitudinal slits of the case; and an arm having the pins thereon and adapted for causing longitudinal sliding of the bearing and the adjusting spindle in the case.

8. A rice-cleaning machine as claimed in claim 2, in which said frame has a bearing case fixed thereto and a bearing being longitudinally slidable in said bearing housing and being connected to an end of the said adjusting spindle and said spindle end being journaled in the said bearing; said case having a pair of longitudinal slits therein and the said bearing having a pair of radially extending pins thereon engaged with the said longitudinal slits of the case; a revolving cylinder in the said case and having a thread groove in the inner surface thereof in which the said pins of the bearing engage; so that the said bearing with the adjusting spindle is longitudinally shifted by rotation of the said cylinder.

9. A rice-cleaning machine as claimed in claim 8, and a pulley keyed on the said revolving cylinder; a brake motor drivably connected to the said pulley to rotate the said revolving cylinder a predetermined amount.

10. A rice-cleaning machine as claimed in claim 2, in which the said arm slider is rotatable with respect to the said adjusting spindle; and the said adjusting spindle having a screw thread at the other end thereof and being engaged in a screw threaded hole in the frame; a wheel handle secured to the end of said spindle adjacent the said screw thread of the spindle for manual longitudinal shifting of the said spindle.

References Cited

UNITED STATES PATENTS

| | | | |
|---|---|---|---|
| 319,788 | 6/1885 | Cockrell | 146—279 X |
| 454,159 | 6/1891 | Anthony | 146—297 |
| 1,104,631 | 7/1914 | Cornwall | 146—297 X |
| 2,173,630 | 9/1939 | Mori | 146—279 X |

W. GRAYDON ABERCROMBIE, *Primary Examiner.*

U.S. Cl. X.R.

146—255, 285, 302